United States Patent
Wang et al.

(10) Patent No.: US 8,510,434 B2
(45) Date of Patent: Aug. 13, 2013

(54) METHOD, SYSTEM AND DNS SERVER FOR LOAD BALANCING NETWORK SERVERS

(75) Inventors: Yanzheng Wang, Shenzhen (CN); Xianneng Zou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 243 days.

(21) Appl. No.: 12/969,065

(22) Filed: Dec. 15, 2010

(65) Prior Publication Data

US 2011/0082931 A1    Apr. 7, 2011

Related U.S. Application Data

(63) Continuation of application No. PCT/CN2009/073101, filed on Aug. 5, 2009.

(30) Foreign Application Priority Data

Aug. 21, 2008    (CN) .......................... 2008 1 0210112

(51) Int. Cl.
    *G06F 15/16*    (2006.01)
(52) U.S. Cl.
    USPC ........................................................ 709/224
(58) Field of Classification Search
    USPC ..................... 709/201, 202, 203, 220, 224
    See application file for complete search history.

(56) References Cited

U.S. PATENT DOCUMENTS

| | | | |
|---|---|---|---|
| 6,578,066 B1 * | 6/2003 | Logan et al. ................. | 718/105 |
| 7,814,180 B2 * | 10/2010 | Pulleyn et al. ............... | 709/220 |
| 2010/0217801 A1 * | 8/2010 | Leighton et al. ............. | 709/203 |

FOREIGN PATENT DOCUMENTS

| | | |
|---|---|---|
| CN | 1558601 A | 12/2004 |
| CN | 1863202 A | 11/2006 |
| CN | 200944605 Y | 9/2007 |
| CN | 101340327 A | 1/2009 |

OTHER PUBLICATIONS

Author: Tao Jin Title: Dynamic DNS Intelligent Load Balancing, Date: Publish 2007, Edition: Computer Knowledge and technology ( academic Exchange) pp. 1-17.*
Chinese Office Action for Chinese Patent Application No. 2008102101124, dated May 5, 2010, and English translation thereof.
Jin Tao; "Dynamic DNS Intelligent Load Balancing"; Computer Knowledge and Technology (Academic Exchange); May 2007; Shanghai, China; and English Abstract thereof; 4 pages.
International Search Report for International Application No. PCT/CN2009/073101, dated Oct. 15, 2009, and English translation thereof.

* cited by examiner

*Primary Examiner* — Asad Nawaz
*Assistant Examiner* — Syed S Ali

(57) ABSTRACT

Embodiments of the present invention provide a method, system and DNS server for load balancing network servers. The method includes: monitoring whether each network server is capable of providing a network service, deleting an IP address of a network server which is incapable of providing a network service from an IP list in a DNS server or setting the IP address as invalid in the IP list according to a monitoring result; receiving, by the DNS server, a request from a network user for accessing a network server, selecting an IP address from valid IP addresses in the IP list which corresponds to the request; providing, by a network server having the selected IP address, network services for the network user.

6 Claims, 3 Drawing Sheets

METHOD, SYSTEM AND DNS SERVER FOR LOAD BALANCING NETWORK SERVERS

CROSS-REFERENCE TO RELATED APPLICATIONS

This application is a continuation of International Application No. PCT/CN2009/073101, filed Aug. 5, 2009. This application claims the benefit and priority of Chinese Application No. 200810210112.4, filed Aug. 21, 2008. The entire disclosures of each of the above applications are incorporated herein by reference.

FIELD

The present disclosure relates to Internet technologies, and particularly, to a method, system and DNS server for load balancing network servers.

BACKGROUND

This section provides background information related to the present disclosure which is not necessarily prior art.

In a collection of network servers in symmetric mode, each of the network servers may provide services for external entities alone without assistance from other network servers. Network server load balancing refers to distributing requests sent to the collection of network servers evenly to the network servers in the collection to make workload of the network servers equalized with each other.

At present, a Domain Name System (DNS) server is a kind of load balancer frequently used. As well known, the DNS server has a record A. In the record A, each domain name corresponds to an IP list. The IP list includes IP addresses of all network servers corresponding to the domain name.

The DNS server may implement network server load balancing by: distributing requests received from network users to network servers whose IP addresses are listed in an IP list corresponding to a domain name carried in the requests, one by one according to the sequence of IP addresses arranged in the IP list. Specifically, the DNS server selects an IP address from the IP list corresponding to the domain name, and returns the IP address to a network user. Then the network user may log on the network server having the IP address to get network services.

Thus, according to the prior art, the DNS server may allocate a network user to a network server corresponding to any IP address in the IP list of the record A. When the network server allocated is down, the network user can not access the network server for network service, which impairs user experience.

SUMMARY

This section provides a general summary of the disclosure, and is not a comprehensive disclosure of its full scope or all of its features.

In view of the above, embodiments of the present invention provide a method, system and DNS server for load balancing network servers to ensure that network users are assigned to accessible network servers to obtain network services.

A method for load balancing network servers includes:
monitoring, by a network server status monitoring module, whether each network server is able to provide a network service; deleting, by a Domain Name System (DNS) server from an IP list of the DNS server according to a monitoring result, an IP address of a network server incapable of providing a network service, or setting the IP address as invalid in the IP list;
receiving, by the DNS server, a request from a network user for accessing a network server, and selecting, by the DNS server, an IP address from valid IP addresses in the IP list which corresponds to the request; providing, by a network server having the IP address selected, a network service for the network user.

A system for load balancing network servers includes a network server status monitoring module and a DNS server;
the network server status monitoring module is adapted to monitor whether each network server is capable of providing a network service, submitting a monitoring result to the DNS server;
the DNS server is adapted to delete an IP address of a network server incapable of providing a network service from an IP list of the DNS server or set the IP address of the network server incapable of providing a network service as invalid in the IP list according to the monitoring result; receive a request for accessing a network server from a network user; select an IP address from valid IP addresses in the IP list which corresponds to the request to make a network server having the selected IP address provide a network service for the network user.

A DNS server for load balancing network servers includes an IP list updating module and an IP address selecting module;
the IP list updating module is adapted to monitor whether each network server is capable of providing a network service; delete an IP address of a network server incapable of providing a network service from an IP list of a DNS server or set the IP address of the network server incapable of providing a network service as invalid in the IP list according to a monitoring result;
the IP address selecting module is adapted to receive a request for accessing a network server from a network user, select an IP address from valid IP addresses in the IP list which corresponds to the request to make a network server having the selected IP address provide a network service for the network user.

As can be seen, embodiments of the present invention monitor a health condition of each network server, i.e. monitor whether each network server is able to provide network services, delete an IP address of a network server incapable of providing network services from an IP list in a DNS server or set the IP address as invalid in the IP list, and select an IP address from valid IP addresses in the IP list. Therefore, it can be avoided that a network user may be assigned to a network server which is down, and it can be ensured that the network user can get network services.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. This invention is hereinafter further described in detail with reference to the accompanying drawings as well as embodiments so as to make the objective, technical solution and merits thereof more apparent.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
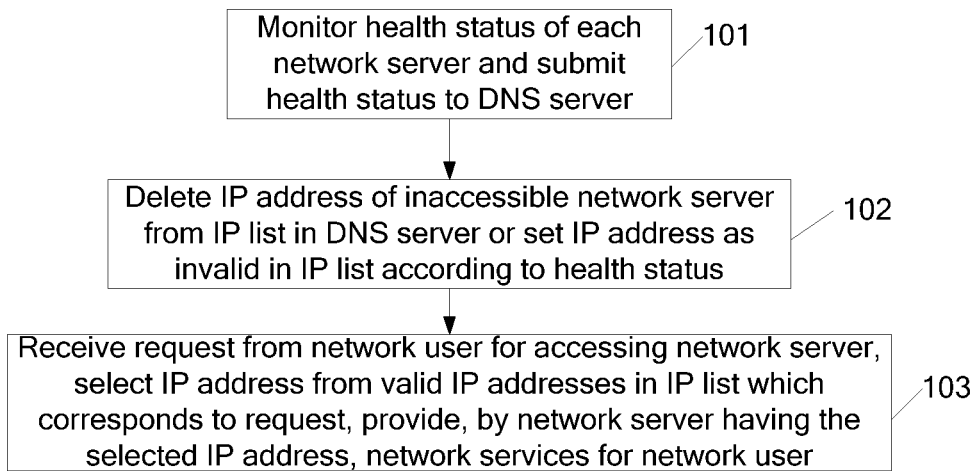
FIG. 1 is a flowchart illustrating a first method for load balancing network servers in accordance with an embodiment of the present invention.

FIG. 1 is a flowchart illustrating a first method for load balancing network servers in accordance with an embodiment of the present invention. The method may include the following steps.

In step 101, a network server status monitoring module monitors a health status of each network server and submits the health status to a DNS server.

The health status of a network server refers to whether the network server is able to provide network services properly. A healthy network server can provide network services as normal, whereas an unhealthy network server can not.

In this step, the network server status monitoring module randomly or periodically accesses each network server whose IP address is listed in an IP list of the DNS server, determines a health status for each network server based on whether the network server can be accessed. Specifically, an accessible network server can be regarded as a healthy network server, and an inaccessible network server can be regarded as a network server which is down.

In this step, the health status submitted to the DNS server may include health statuses of all network servers, or only include information of network servers which are down, or only include information of healthy network servers.

In step 102, the DNS server deletes an IP address of a network server which is inaccessible from the IP list of the DNS server or sets the IP address of the network server which is inaccessible in the IP list as invalid according to the health status.

In this step, if all inaccessible IP addresses are deleted, the remaining IP addresses in the IP list of the DNS server are all valid IP addresses; if all the inaccessible IP addresses are set as invalid, other IP addresses that are not set as invalid are valid IP addresses.

In step 103, the DNS server receives a request from a network user for accessing a network server, and selects an IP address from the valid IP addresses in the IP list which corresponds to the request; a network server having the selected IP address provides network services for the network user.

In this step, the DNS server takes an IP list listing IP addresses of network servers which have the domain name carried in the request from the network user as the IP list which corresponds to the request.

The DNS server returns the selected IP address to a client of the network user, so that the client of the network user may log on the network server having the selected IP address to get network services according to the selected IP address.

Since the IP address of a network server which is to provide network services for the network user is selected by the DNS server from the valid IP addresses in the IP list, it can be avoided that the network user may log on a network server which is down. It is guaranteed that the network server accessed by the network user is healthy and the network user can get network services.

In order to provide high quality network services for network users, embodiments of the present invention provide a second method for load balancing network servers. In the second method, a DNS server may also take a current health status, workload condition and/or network data rate of each network server into consideration when selecting an IP address for providing network services for a network user, so as to assign the network user to a proper network server.

Figure 2:
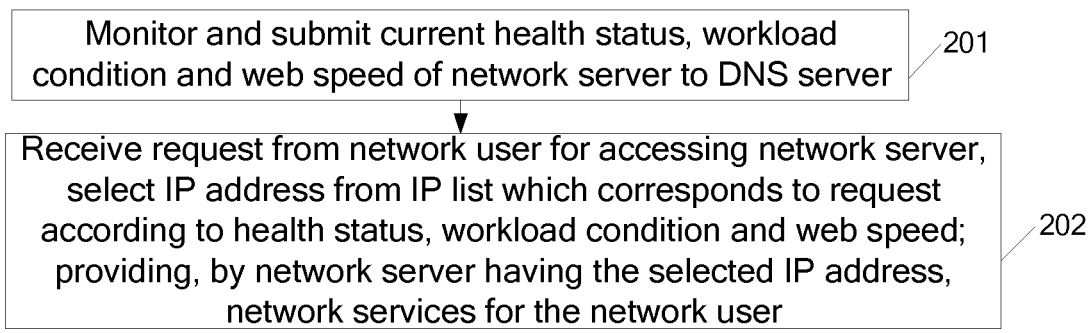
FIG. 2 is a flowchart illustrating a second method for load balancing network servers in accordance with an embodiment of the present invention.

FIG. 2 is a flowchart illustrating a second method for load balancing network servers in accordance with an embodiment of the present invention. The method may include the following steps.

In step 201, a current health status, workload condition and/or network data rate of a network server is monitored and submitted to a DNS server.

In this step, the current health status of the network server is monitored by a server status monitoring module, and the detailed monitoring and submitting procedure is the same as that described in step 101.

In this step, the current workload condition of a network server is monitored by a network server workload monitoring module. The network server workload monitoring module then determines the workload condition of each network server by monitoring data traffic of the network server. Specifically, the larger the data traffic is, the heavier the workload is; the smaller the data traffic is, the lighter the workload is.

In this step, a speed test server in each Internet Data Center (IDC) measures a web speed between the speed test server and each network user client, calculates, according to web speeds measured and the geographical location and Internet service provider (ISP) which the network user clients belong to, an average of the web speeds respectively from all network user clients whose IP addresses belong to the same geographical location and belong to the same ISP to the IDC.

Because the speed test server in each IDC is able to obtain an average of the web speeds respectively from all network user clients to the IDC, an average web speed from each network user client to each IDC can be obtained according to averages obtained by the speed test servers of all IDCs. Based on the average web speed from each network user client to each IDC, a relation which associates an IDC, an average web speed, a geographical location of an IP address of a network user client and an ISP of the IP address can be established.

All the averages obtained by each speed test server in each IDC can be collected to obtain an average web speed from each network user client to each IDC for establishing the relation which associates an IDC, an average web speed, a geographical location which an IP address of a network user client belongs to and an ISP which the IP address belongs to. Then the relation may be submitted to the DSN server. Alternatively, each speed test server in each IDC may directly submit the average web speeds obtained by the speed test server to the DNS, and the DNS server establishes the relation which associates an IDC, an average web speed, a geographical location which an IP address of a network user client belongs to and an ISP which the IP address belongs to according to the average web speeds submitted by each speed test server in each IDC.

The network server status monitoring module, the network server workload monitoring module and the speed test server operate in parallel in this step. Therefore, the health status, the workload condition and the web speed may be submitted individually without following a chronological order.

In step 202, the DNS server receives a request from a network user for accessing a network server, selects an IP address from an IP list which corresponds to the request according to the health status, the workload condition and/or the web speed; a network server having the selected IP address provides network services for the network user. For example, the DNS server first determines the health status, and if the health status is healthy, determines the workload condition, and if the workload condition is lower, determines the web speed.

When the IP address is selected according to the health status and the workload condition, an IP address of a network server having lighter workload may be selected, e.g. an IP address of a network server whose data traffic is smaller than pre-determined data traffic in amount is selected, or an IP address of a network server accessed by users fewer than a pre-determined number is selected.

When the IP address is selected according to the health status and the web speed, an IP address of a network server in an IDC which has a faster web speed may be selected from the valid IP addresses in the IP list according to web speeds from the network user client which sends the request to all the IDCs.

When the IP address is selected according to the health status and the workload condition and the web speed, both the workload condition of each network server and the web speed from the network user client to each network server will be taken into account when an IP address is selected from the valid IP addresses in the IP list which corresponds to the request. For example, an IP address of a network server with smaller workload and a faster web speed to the network user client may be selected among the valid IP addresses in the IP list.

Figure 3:
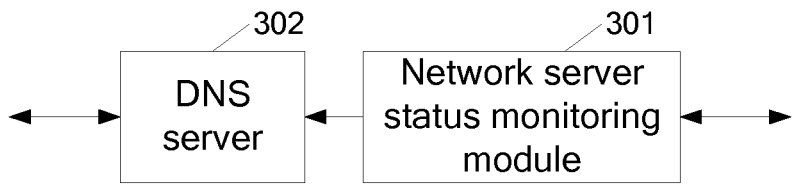
FIG. 3 is a block diagram illustrating a structure of a first system for load balancing network servers in accordance with an embodiment of the present invention.

FIG. 3 is a block diagram illustrating a structure of a first system for load balancing network servers in accordance with an embodiment of the present invention. As shown in FIG. 3, the system may include a network server status monitoring module 301 and a DNS server 302.

The network server status monitoring module 301 is adapted to monitor a health status of each network server and submits the health status to the DNS server 302.

The DNS server 302 is adapted to delete an IP address of a network server incapable of providing network services from an IP list of the DNS server or set the IP address as invalid in the IP list according to the health status; receive a request from a network user for accessing a network server; select an IP address from valid IP addresses in the IP list which corresponds to the request to make the network server having the selected IP address provide network services for the network user.

Figure 4:
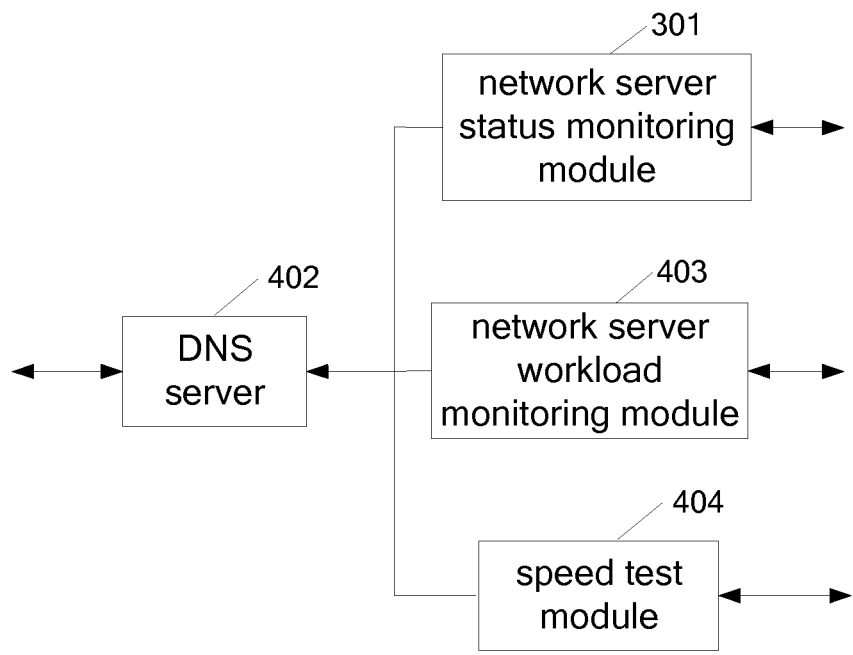
FIG. 4 is a block diagram illustrating a structure of a second system for load balancing network servers in accordance with an embodiment of the present invention.

FIG. 4 is a block diagram illustrating a structure of a second system for load balancing network servers in accordance with an embodiment of the present invention. As shown in FIG. 4, the system may include a network server status monitoring module 301, a DNS server 402 and a network server workload monitoring module 403.

The network server status monitoring module 301 is similar to the network server status monitoring module 301 shown in FIG. 3.

The network server workload monitoring module 403 is adapted to monitor a current workload condition of each network server, and submit the workload condition to the DNS server 402.

The DNS server 402 is adapted to delete an IP address of a network server incapable of providing network services from an IP list of the DNS server or set the IP address as invalid in the IP list according to the health status; receive a request from a network user for accessing a network server; select an IP address of a network server whose workload condition satisfies a pre-determine condition from valid IP addresses in the IP list which corresponds to the request to make the network server having the selected IP address provide network services for the network user.

The system may further include a speed test module 404.

The speed test module 404 is adapted to measure a web speed from the network user client to each network server in each IDC, establish and store a relation which associates an IDC, the web speed and the IP address of the network user client.

Accordingly, the DNS server 402 is further adapted to select, according to the relation and according to an IP address of the network user client carried in the request, an IP address of a network server in an IDC whose workload condition and web speed both satisfy a pre-determined condition among the valid IP address in the IP list which corresponds to the request.

Figure 5:
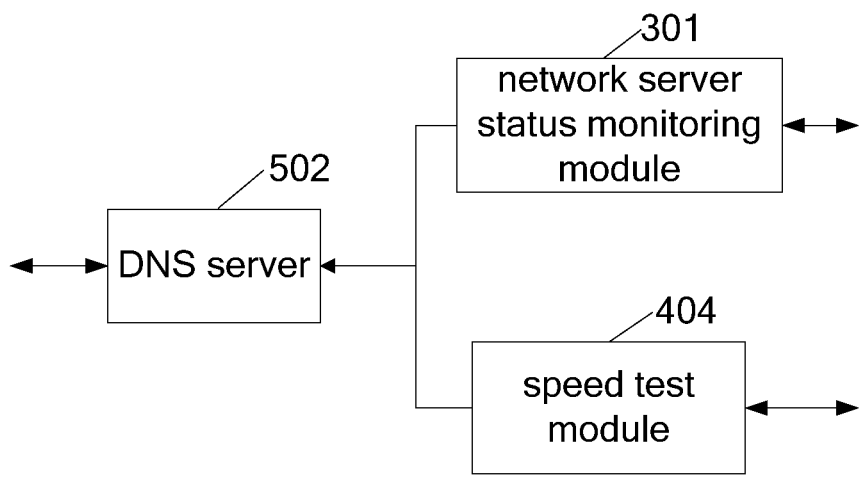
FIG. 5 is a block diagram illustrating a structure of a third system for load balancing network servers in accordance with an embodiment of the present invention.

FIG. 5 is a block diagram illustrating a structure of a third system for load balancing network servers in accordance with an embodiment of the present invention. As shown in FIG. 5, the system may include a network server status monitoring module 301, a DNS server 502, and a speed test module 404.

The network server status monitoring module 301 in FIG. 5 is similar to the network server status monitoring module 301 in FIG. 3, and the speed test module 404 in FIG. 5 is similar to the speed test module 404 in FIG. 4.

The DNS server 502 is adapted to delete an IP address of a network server incapable of providing network services from an IP list of the DNS server or set the IP address as invalid in the IP list according to the health status; receive a request from a network user for accessing a network server; select an IP address of a network server whose web speed satisfies a pre-determine condition from valid IP addresses in the IP list which corresponds to the request. The pre-determined condition may be that the web speed should be higher than a pre-determined threshold, or that the web speed from the network user client to the selected network server should be higher than those from the network user client to other network servers.

Figure 6:
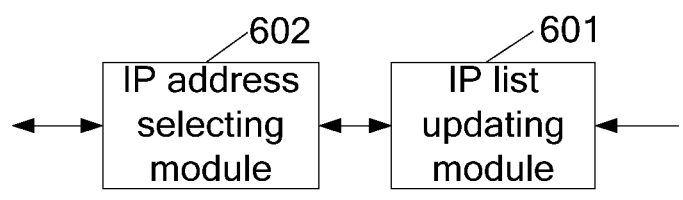
FIG. 6 is a block diagram illustrating a first structure of a DNS server for load balancing network servers in accordance with an embodiment of the present invention.

FIG. 6 is a block diagram illustrating a first structure of a DNS server for load balancing network servers in accordance with an embodiment of the present invention. As shown in FIG. 6, the DNS server may include an IP list updating module 601 and an IP address selecting module 602.

The IP list updating module 601 is adapted to delete an IP address of a network server which can not be accessed from an IP list in the DNS server according to a health status of each network server, or set the IP address as invalid.

The IP address selecting module 602 is adapted to receive a request of a network user for accessing a network server, select an IP address from valid IP addresses in the IP list which corresponds to the request to make a network server having the selected IP address provide network services for the network user.

Figure 7:
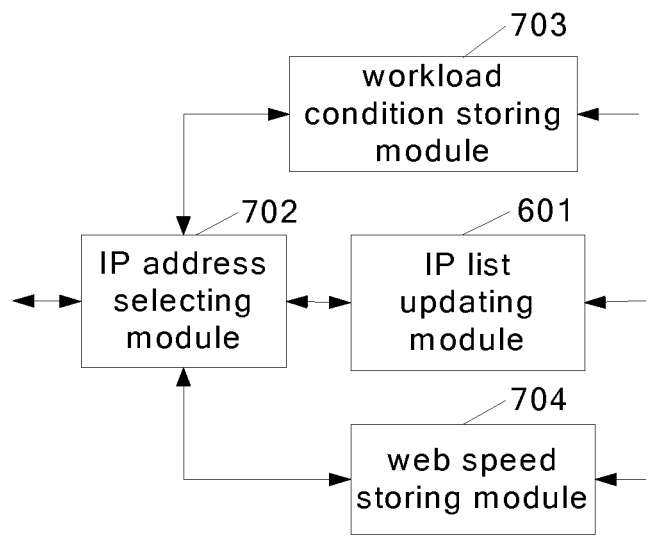
FIG. 7 is a block diagram illustrating a second structure of DNS server for load balancing network servers in accordance with an embodiment of the present invention.

FIG. 7 is a block diagram illustrating a second structure of a DNS server for load balancing network servers in accordance with an embodiment of the present invention. As shown in FIG. 7, the DNS server may include an IP list updating module 601, an IP address selecting module 702 and a workload condition storing module 703.

The IP list updating module 601 in FIG. 7 is similar to the IP list updating module 601 in FIG. 6.

The workload condition storing module 703 is adapted to store a current workload condition of each network server.

The IP address selecting module 703 is adapted to receive a request from a network user for accessing a network server, select an IP address of a network server whose workload condition satisfies a pre-determined condition among valid IP addresses in an IP list which corresponds to the request.

The DNS server may further include a web speed storing module 704.

The web speed storing module 704 is adapted store a relation which associates an IDC, a web speed and an IP address of a network user client.

Accordingly, the IP address selecting module 702 is adapted to receive a request from a network user for accessing a network server, select, according to an IP address of the network user client carried in the request and the relation, an IP address of a network server in an IDC whose web speed satisfies a pre-determined condition among valid IP addresses in an IP list which corresponds to the request.

Figure 8:
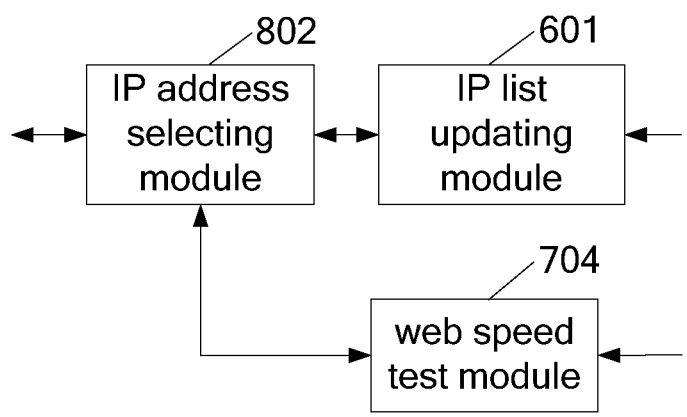
FIG. 8 is a block diagram illustrating a third structure of DNS server for load balancing network servers in accordance with an embodiment of the present invention.

FIG. 8 is a block diagram illustrating a third structure of a DNS server for load balancing network servers in accordance with an embodiment of the present invention. As shown in FIG. 8, the DNS server may include an IP list updating module 601, an IP address selecting module 802 and a web speed storing module 704.

The IP list updating module 601 in FIG. 8 is similar to the IP list updating module 601 in FIG. 6, and the web speed storing module 704 in FIG. 8 is similar to the web speed storing module 704 in FIG. 7.

The IP address selecting module 802 is adapted to receive a request from a network user for accessing a network server, select, according to an IP address of the network user client carried in the request and the relation, an IP address of a network server in an IDC whose web speed satisfies a pre-determined condition among valid IP addresses in an IP list which corresponds to the request.

As can be seen from the above technical scheme, an IP address of an inaccessible network server can be deleted from an IP list in the DNS server or be set as invalid in the IP list according to a health status of each network server monitored. Thus, it can be avoided that a network user is assigned to a network server which is down, and it can be assured that the network user can be assigned to a healthy network server to get network services.

Besides the health status, the current workload condition and/or web speed of each network server is also monitored. Therefore, the health status, the current workload condition and/or web speed of each network server are taken into consideration when the IP address of a network server is selected to provide network services for the network user client. In this way, an accessible network server with light workload and/or higher web speed can be assigned to the network user client, which implements load balancing among the network servers while raises the quality of network services provided for the network user and also improves user experience.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for load balancing network servers, comprising:
    monitoring, by a network server status monitoring module, whether each network server is capable of providing a network service; deleting, by a Domain Name System (DNS) server from an IP list of the DNS server according to a monitoring result, an IP address of a network server incapable of providing a network service, or setting the IP address as invalid in the IP list;
    measuring, by a speed test server in each IDC, a web speed between the speed test server and each network user client, calculating an average of web speeds between the IDC and network user clients whose IP addresses belong to a same geographical location and belong to a same Internet Service Provider (ISP) according to the web speeds measured and the geographical location and ISP to which the network user clients belong;
    establishing a relation which associates the IDC, the average of the web speeds, the geographical location and ISP which the IP address of the network user client belongs to;
    receiving, by the DNS server, a request from a network user for accessing a network server, selecting, from the valid IP addresses in the IP list which corresponds to the request, an IP address of a network server in an IDC whose web speed satisfies a pre-determined condition according to the relation and the IP address of the network server client carried in the request; and
    monitoring, by a network server workload status monitoring module, a current workload condition of each network server; wherein selecting the IP address from the valid IP addresses in the IP list which corresponds to the request comprises: selecting an IP address of a network server whose workload condition satisfies a pre-determined condition from the valid IP addresses in the IP list which corresponds to the request.

2. The method of claim 1, further comprising: before selecting the IP address from the IP list which corresponds to the request, determining an IP list which lists IP addresses of network servers having a domain name carried in the request as the IP list which corresponds to the request.

3. The method of claim 1, wherein monitoring whether each network server is capable of providing a network service comprises: accessing each network server whose IP address is listed in the IP list in the DNS server randomly or periodically, determining a network server that can be accessed as capable of providing a network service and determining a network server that can not be accessed as incapable of providing a network service.

4. The method of claim 1, wherein monitoring the current workload condition of each network server comprises: monitoring data traffic of each network server, and determining the current workload condition of the network server according to the data traffic.

5. A system for network server load balancing, comprising: a network server status monitoring module, a speed test module and a Domain Name System (DNS) server; wherein the network server status monitoring module is adapted to monitor whether each network server is capable of providing a network service, submitting a monitoring result to the DNS server;

the speed test module is in each IDC and adapted to measure a web speed between the speed test server and each network user client, calculate an average of web speeds between the IDC and network user clients whose IP addresses belong to a same geographical location and belong to a same Internet Service Provider (ISP) according to the web speeds measured and the geographical location and ISP to which the network user clients belong, and establish a relation which associates the IDC, the average of the web speeds, the geographical location and ISP which the IP address of the network user client belongs to;

the DNS server is adapted to delete an IP address of a network server incapable of providing a network service from an IP list of the DNS server or set the IP address of the network server incapable of providing a network service as invalid in the IP list according to the monitoring result; receive a request for accessing a network server from a network user; select, from the valid IP addresses in the IP list which corresponds to the request, an IP address of a network server in an IDC whose web speed satisfies a pre-determined condition according to the relation and the IP address of the network server client carried in the request; and monitoring, by a network server workload status monitoring module, a current workload condition of each network server; wherein selecting the IP address from the valid IP addresses in the IP list which corresponds to the request comprises: selecting an IP address of a network server whose workload condition satisfies a pre-determined condition from the valid IP addresses in the IP list which corresponds to the request.

6. The system of claim 5, further comprising a network server workload monitoring module; the network server workload monitoring module is adapted to monitor a current workload condition of each network server, and submit the workload condition to the DNS server; wherein the DNS server is further adapted to select, from the valid IP addresses in the IP list which corresponds to the request from the network user for accessing a network server, an IP address of a network server whose workload condition satisfies a pre-determined condition.

* * * * *